UNITED STATES PATENT OFFICE.

FREDERICK W. NEWTON, OF SOUTH ORANGE, NEW JERSEY, (RICHARD C. NEWTON, ADMINISTRATOR.)

IMPROVEMENT IN SIZING CLOTHS.

Specification forming part of Letters Patent No. 148,319, dated March 10, 1874; application filed February 28, 1874.

*To all whom it may concern:*

Be it known that I, FREDERICK W. NEWTON, of South Orange, Essex county, New Jersey, have invented a new and Improved Sizing for Finishing Cloths, Garments, and Yarns made of cotton, linen, wool, silk, or other vegetable or animal fiber; and I herewith annex a full description of the use and application thereof.

The nature of the invention is the employment of glucose or grape-sugar as the basis of a size for finishing cotton and woolen fabrics, yarns, &c.

It is well known that the "size" most commonly used on yarns or fabrics made from vegetable fiber, is mainly, and sometimes entirely, composed of starch. There has always been this objection to starch, that, if used in such quantities as to give weight and body to the fabric or yarn, it makes it too stiff for many purposes, and especially that it makes cloth hard to sew.

The demand is universal for some sort of sizing for finishing goods that does not stiffen them or make them harsh. A great many expedients have been resorted to for the purpose of counteracting the tendency of starch to hardness. Various kinds of oil are used; but lard, and especially tallow, are more commonly mixed with the starch. But even with these it is impossible to obtain the desired softness to the touch, and besides anything oily or greasy is objectionable in cloth.

I have found that glucose, when mixed with starch, obviates this tendency more completely than anything heretofore used; and, furthermore, I find that in some cases it is better to use the glucose alone, omitting the starch entirely.

Glucose, as well as dextrine, is made from starch, and the chemical constituents of the three are very similar, yet in practical use they differ entirely. Starch is only fit for stiffening, while glucose, not being susceptible of granulation, or becoming hard, acts like oil, softening instead of stiffening, and giving a peculiar velvety feeling to goods.

Although I have generally used the common glucose of commerce, which is made from potato-starch, yet I do not wish to be understood as confining myself to the use of glucose made from starch; but I desire to include non-crystallizable sugar, of which glucose is the type, and I use the word "glucose" in a generic sense.

There are two kinds of sugar, sucrose or cane-sugar, susceptible of granulation, and glucose or grape-sugar, which is not susceptible of granulation, and these two kinds are both produced from a great variety of substances. Cane-sugar or sucrose has a certain amount that is non-crystallizable, which goes off in the molasses, and which might be separated and made into glucose. So glucose, when produced from starch, may be so made as to contain a considerable percentage of sucrose; but glucose grape-sugar, or, as it is sometimes improperly called, fructose or dextrose, when made for the purpose of size, should have no crystallizable property whatever, but should be entirely without grain, perfectly soft and glutinous; and when so made, whether produced from starch, grapes, wood, or any other substance, it is the substance which I call glucose, and which is hard to dissolve in cold water, has comparatively small sweetening power, and is not susceptible of granulation, and is really a very different thing from what we ordinarily call sugar. Besides this, I have discovered that glucose, when combined with glycerine, is equally valuable in finishing some styles of woolen fabrics, as well as those composed of cotton and wool mixed.

Almost all textile fabrics, of whatever nature or material, depend for their appearance and style not alone upon the materials of which they are composed, but upon the finish which is given them after weaving, and very generally the basis of this finish is the sizing with which the cloth is stiffened, and made to "hang" and "fold" properly.

Glycerine has been used in finishing woolen goods, for the purpose of softening and giving solidity to them; but glycerine lacks body, and is very sensitive to atmospheric changes, while glucose has a heavy body, and is comparatively insensible to changes of the atmosphere. Therefore, the addition of a certain proportion of glucose to the glycerine, varied according to the fabric to be treated, has a tendency to obviate this difficulty.

The usual method of application is to dissolve the glucose in water, using three or more parts of water. It then can be used by itself, like any other sizing, or to the mixture may be added starch, glycerine, bluing, or any other substance that may be needed.

In many cases it would doubtless be more economical to apply the mixture to the yarn before weaving, and in other cases to the cloth after it is made into garments.

What I claim as my invention, and desire to secure by Letters Patent, is—

1. The process of finishing and sizing fabrics, yarns, or garments made of cotton, linen, or other fiber, by means of glucose or grape-sugar, substantially as described.

2. The combination of glucose or grape-sugar and glycerine in compound for treating fabrics, yarns, or garments, composed wholly or in part of wool or other animal fiber, substantially as described.

FREDERICK W. NEWTON.

Witnesses:
G. J. BROWNE,
R. F. THOMAS.